(12) United States Patent
Rodríguez Tejido et al.

(10) Patent No.: US 10,479,291 B2
(45) Date of Patent: Nov. 19, 2019

(54) HEADLINER FOR VEHICLE ROOF WITH TRANSPARENT PORTION

(71) Applicant: GRUPO ANTOLÍN-INGENIERÍA, S. A., Burgos (ES)

(72) Inventors: Abel Rodríguez Tejido, Burgos (ES); Enrique Fernández Salvador, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 26 days.

(21) Appl. No.: 15/558,383

(22) PCT Filed: Mar. 18, 2015

(86) PCT No.: PCT/ES2015/070189
§ 371 (c)(1),
(2) Date: Sep. 14, 2017

(87) PCT Pub. No.: WO2016/146860
PCT Pub. Date: Sep. 22, 2016

(65) Prior Publication Data
US 2018/0079373 A1    Mar. 22, 2018

(51) Int. Cl.
*B60R 13/02* (2006.01)
(52) U.S. Cl.
CPC ................. *B60R 13/0231* (2013.01)
(58) Field of Classification Search
CPC .................................................. B60R 13/0231
USPC ....................................................... 296/114
See application file for complete search history.

(56) References Cited

U.S. PATENT DOCUMENTS

| | | | |
|---|---|---|---|
| 8,764,891 B1* | 7/2014 | Brown | B60R 13/0231 296/216.07 |
| 2012/0126583 A1* | 5/2012 | Brown | B60R 13/0231 296/210 |

FOREIGN PATENT DOCUMENTS

| | | |
|---|---|---|
| DE | 10308082 B3 | 4/2004 |
| EP | 2666672 A1 | 11/2013 |

OTHER PUBLICATIONS

Oct. 30, 2015—(WO) International Search Report—App PCT/ES2015/070189.

* cited by examiner

*Primary Examiner* — Joseph D. Pape
*Assistant Examiner* — Dana D Ivey
(74) *Attorney, Agent, or Firm* — Banner & Witcoff, Ltd.

(57) ABSTRACT

Headliner for vehicle roof with a transparent portion, where said headliner comprises an opening in correspondence with said transparent portion. To reinforce the headliner weakened by the presence of the opening, the headliner comprise a plastic frame in a single piece located in the area corresponding to the perimeter of the opening and attached to the headliner comprising four straight segments and four curved segments distributed along the entire perimeter of the opening, such that each curved segment is connected to two of the straight segments, and such that each one of the curved segments comprises a notch the edge thereof describes a curved line without corners that delimits the area of said notch.

5 Claims, 1 Drawing Sheet

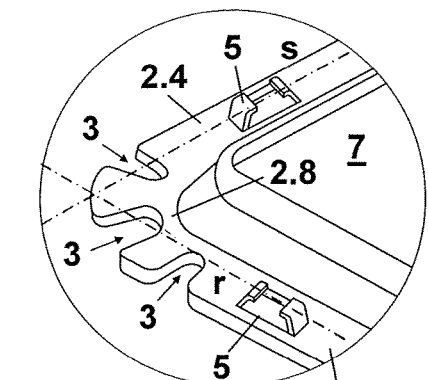
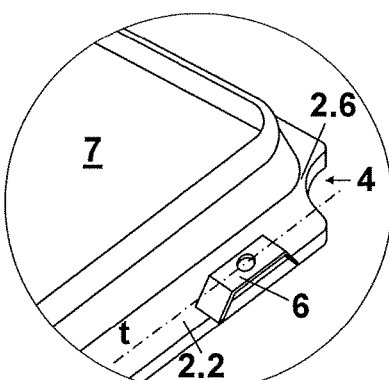
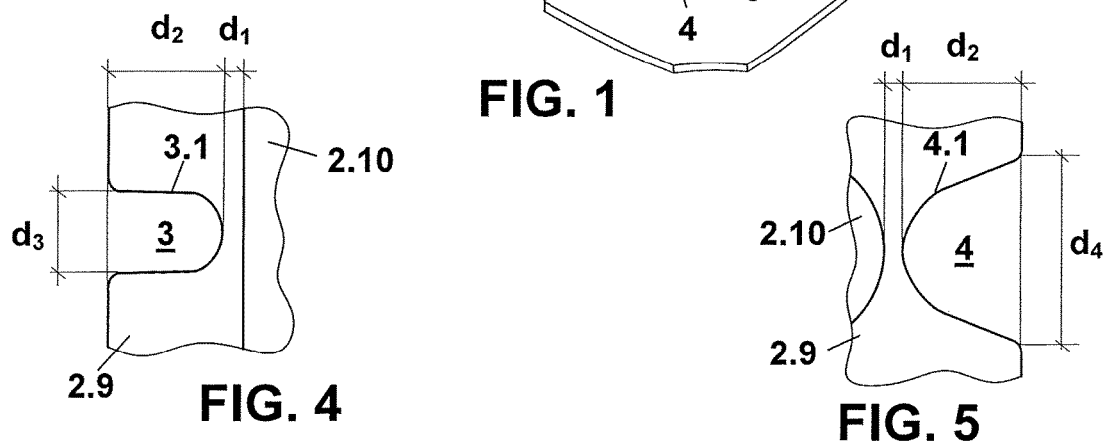

HEADLINER FOR VEHICLE ROOF WITH TRANSPARENT PORTION

The present application is a U.S. National Phase Application under 35 U.S.C. § 371 of PCT/ES2015/070189 filed Mar. 18, 2015 which is incorporated by reference herein in its entirety.

FIELD OF THE INVENTION

The present invention relates to a headliner for vehicle roof with a transparent portion, where said headliner comprises an opening in correspondence with said transparent portion.

BACKGROUND OF THE INVENTION

Headliners comprising large openings meant to cover roofs provided with a transparent portion, such as a sunroof or a panoramic roof, require reinforcement in the opening area to maintain the rigidity of the headliner.

The use of metal reinforcement frames for this purpose is known.

To reduce weight, particularly when the opening corresponding to the transparent portion has large dimensions, the replacement of metal frames with plastic frames is known.

However, plastic materials have a high coefficient of expansion compared to metals. Consequently, plastic frames have drawbacks related to the appearance of deformations due to thermal loads, an effect that is particularly significant in the vehicle roof, which is exposed to high temperatures.

In order to minimise said deformations, document EP2305517 is known, disclosing a reinforcement segmented into several portions, as the deformation is proportional to the length of the segments that form the reinforcement. However, the drawback of this solution is that it is complex, particularly with regard to the assembly thereof on the headliner.

Thus, the aim of the invention is to maintain the weight reduction of the headliner using a plastic frame while preventing the deformation of the plastic frame and consequently of said headliner, by the use of a reinforcement with a simple construction and assembly.

DESCRIPTION OF THE INVENTION

The present invention is established and characterised by the independent claims, while the dependent claims describe additional features thereof.

The presence of notches of the curved segments of the plastic frame allows releasing tension accumulated in said critical areas due to the high coefficient of expansion of the plastic which result in the deformation of the plastic frame, and consequently of the headliner to which said frame is joined due to the different coefficients of expansion of each component.

Moreover, the special construction of the notches with rounded shapes allows preventing concentration of tensions and appearance of cracks in the plastic frame, which would weaken the same.

Finally, the construction of the plastic frame in a single part allows a quick and simple assembly thereof on the headliner.

DESCRIPTION OF THE FIGURES

The present specification is completed by a set of figures that illustrate a preferred embodiment and in no way limit the invention.

FIG. 1 shows a perspective view of the headliner with the plastic frame.

FIG. 2 shows an enlarged view of FIG. 1 corresponding to one of the curved segments of the plastic frame.

FIG. 3 shows another enlarged view of FIG. 1 corresponding to another curved segment of the plastic frame.

FIG. 4 shows a plan view of a portion of one of the notches.

FIG. 5 shows a plan view of a portion of another one of the notches.

DETAILED DESCRIPTION OF THE INVENTION

As shown in FIG. 1, the headliner (1) for vehicle roof with a transparent portion (not shown) comprises a central opening (7) in correspondence with said transparent portion, and a front area A in correspondence with the front area of the vehicle roof and a rear area B in correspondence with the rear area of the vehicle roof.

To reinforce the headliner (1) weakened by the presence of the opening (7), the former comprises a plastic frame (2) in a single piece located in the area corresponding to the perimeter (7.1) of the opening (7) and attached to the headliner (1).

The plastic frame (2) has a rectangular shape and comprises:

four straight segments (2.1, 2.2, 2.3, 2.4) and four curved segments (2.5, 2.6, 2.7, 2.8) arranged along the entire perimeter (7.1) of the opening (7), such that each curved segment (2.5, 2.6, 2.7, 2.8) is connected to two of the straight segments (2.1, 2.2, 2.3, 2.4), each one of said straight segments (2.1, 2.2, 2.3, 2.4) and curved segments (2.5, 2.6, 2.7, 2.8) comprises a first flange (2.9), substantially flat and attached to the headliner (1), and a second flange (2.10) attached to the first flange (2.9) along the entire length thereof, extending with respect to said first flange (2.9) towards the vehicle roof when the headliner (1) is mounted on the vehicle roof;

each one of the curved segments (2.5, 2.6, 2.7, 2.8) comprises in the first flange (2.9) a notch (3, 4), open towards the headliner (1), the edge thereof (3.1, 4.1) describes a curved line without corners delimiting the area of the notch (3, 4) such that the dimension d1 of the depth of the first flange (2.9) in the notch (3, 4) is less than the dimension d2 of the depth of the notch (3, 4).

Where d1 is the smaller of the dimensions corresponding to the depth of the flange (2.9) in the area of the notch (3, 4) and d2 is the greater of the dimensions corresponding to the depth of the notch (3, 4).

In addition, the plastic frame (2) is provided along the straight segments (2.1, 2.2, 2.3, 2.4) thereof with connection means (5, 6) for said plastic frame (2) to the vehicle roof, which can comprise fixed connection means (6), defining a single position, or sliding connection means (5), that allow establishing the connection at a variable position along a longitudinal axis corresponding to each one of the straight segments (2.1, 2.2, 2.3, 2.4).

As can be seen in the enlarged view of FIGS. 2 and 4, at least one of the curved segments (2.7, 2.8) is placed between two sliding connection means (5), and comprises at least one additional notch (3), and in this particular case a total of three notches (3), such that the dimension d3 of the width of the area of each notch (3) is smaller than the dimension d2 of the depth thereof.

Where d2 is the greater of the dimensions corresponding to the width of the notch (3).

In this case and since the sliding connection means (5) allow the deformation of the straight segments (2.1, 2.4) along the longitudinal axes "r" and "s" of each of said straight segments (2.1, 2.4), the expansion caused by the thermal loads on said straight segments (2.1, 2.4) is a surface expansion, the dimension d3 of the width of the notches (3) is smaller and is distributed in several notches (3).

As shown in the enlarged view shown in FIGS. 3 and 5, at least one of the curved segments (2.5, 2.6) is located adjacent to a fixed connection means (6). In this case the corresponding notch (4) has a width dimension d4 greater than the depth dimension d2 thereof.

Where d4 is the greater of the dimensions corresponding to the width of the notch (4).

In this case, and since the fixed connection means (6) do not allow the deformation of the straight segment (2.2) along the longitudinal axis "t" thereof, the expansion caused by the thermal loads on said straight segment (2.2) is a cubic expansion, such that the dimension d4 of the width of the notch (4) located in the curved segment (2.5) is large.

In a preferred embodiment, two fixed connection means (6) are located in the straight segment (2.2) located in correspondence with the front area A of the headliner (1) to ensure the position of the headliner (1) and a correct aesthetic appearance of the area visible to the occupants of the vehicle, and the sliding connection means (5) are distributed among the other three straight segments (2.1, 2.3, 2.4).

The invention claimed is:

1. Headliner for vehicle roof with a transparent portion, wherein said headliner comprises an opening, having a perimeter, for receiving said transparent portion, and a rectangular plastic frame for reinforcement in a single part comprising:
    four straight segments and four curved segments distributed along the entire perimeter of the opening, such that each curved segment is connected to two of the straight segments,
    each one of said straight segments and curved segments comprises a first flange, substantially flat, attached to the headliner, and a second flange joined to the first flange along the entire length thereof and extending with respect to said first flange toward the vehicle roof;
    each one of the curved segments is provided in the first flange with a notch open towards the headliner, the notch having a curved edge without corners delimits the area of the notch such that the dimension d1 of the depth of the first flange in the notch is smaller than the dimension d2 of the depth of the notch.

2. Headliner for vehicle roof with a transparent portion according to claim 1, wherein the plastic frame is provided along the straight segments thereof with connection means of said plastic frame to the vehicle roof, comprising fixed connection means that define a single position or sliding connection means that allow establishing the connection at a variable position along a longitudinal axis corresponding to each one of the straight segments.

3. Headliner for vehicle roof with a transparent portion according to claim 2, wherein one of the curved segments is placed between two sliding connection means, and comprises an additional notch, such that the width dimension d3 of the area of each of the notches is smaller than the depth dimensions d2 thereof.

4. Headliner for vehicle roof with a transparent portion according to claim 2, wherein one of the curved segments is placed adjacent to fixed connection means, and the corresponding notch thereof has a width dimension greater than the depth dimension d2 thereof.

5. Headliner for vehicle roof with a transparent portion according to claim 2,
    wherein one of the curved segments is placed between two sliding connection means, and comprises an additional notch, such that the width dimension d3 of the area of each of the notches is smaller than the depth dimensions d2 thereof,
    wherein one of the curved segments is placed adjacent to fixed connection means, and the corresponding notch thereof has a width dimension greater than the depth dimension d2 thereof,
    and wherein the fixed connection means are located in the straight segment placed in correspondence with a front area A of the headliner, and the sliding connection means are distributed among the other three straight segments.

* * * * *